United States Patent
Naylor

(10) Patent No.: US 6,804,642 B1
(45) Date of Patent: Oct. 12, 2004

(54) APPARATUS AND METHOD FOR CONTINUOUS SPEECH RECOGNITION ON A PCMCIA CARD

(75) Inventor: Joe A. Naylor, San Diego, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 615 days.

(21) Appl. No.: 08/881,741

(22) Filed: Jun. 24, 1997

(51) Int. Cl.⁷ .............................................. G10L 15/00
(52) U.S. Cl. ...................................... 704/231; 704/270
(58) Field of Search ................................ 704/246, 248, 704/250

(56) References Cited

U.S. PATENT DOCUMENTS

| | | | |
|---|---|---|---|
| 4,837,830 A | * | 6/1989 | Wrench, Jr. et al. .......... 381/42 |
| 5,353,377 A | * | 10/1994 | Kuroda et al. ............. 395/2.65 |
| 5,459,798 A | * | 10/1995 | Bailey et al. ............... 382/218 |
| 5,539,616 A | * | 7/1996 | Kikinis ...................... 361/686 |
| 5,600,781 A | * | 2/1997 | Root et al. .................. 395/326 |
| 5,615,296 A | * | 3/1997 | Stanford et al. ............. 395/2.1 |
| 5,680,126 A | * | 10/1997 | Kikinis ........................ 341/22 |
| 5,715,369 A | * | 2/1998 | Spoltman et al. .......... 395/2.79 |
| 5,752,232 A | * | 5/1998 | Basore et al. ............... 704/275 |

\* cited by examiner

*Primary Examiner*—Richemond Dorvil
*Assistant Examiner*—Michael N. Opsasnick
(74) *Attorney, Agent, or Firm*—Duane Morris LLP

(57) ABSTRACT

An apparatus and method for automatic continuous-speech recognition is disclosed. The recognition function for a speaker-dependent continuous-speech recognition (CSR) system is performed on a (PCMCIA) card, which includes a DSP, Codec, and memory. All of the processing performed by the CPU, DSP, and special DTW chip in prior art systems are performed in the single DSP on the PCMCIA card. Recognition results computed on the card are uploaded to the host computer application (for command interpretation and processing), via the PCMCIA interface. The host computer may comprise a personal computer, making this invention particularly well-suited for use in military or other such operations which require light-weight portable computers.

15 Claims, 2 Drawing Sheets

COMPONENTS OF THE INVENTION PCMCIA RECOGNIZER.

SCHEMATIC OF ITT VRS 1290 PROCESSING ELEMENTS.

COMPONENTS OF THE INVENTION PCMCIA RECOGNIZER.

PCMCIA CSR SYSTEM MODEL.

APPARATUS AND METHOD FOR CONTINUOUS SPEECH RECOGNITION ON A PCMCIA CARD

FIELD OF THE INVENTION

This invention relates to a method and apparatus for automatic continuous-speech recognition, and more particularly, to a speaker-dependent continuous-speech recognition (CSR) system in which the recognition function is performed on a Personal Computer Memory Card International Association (PCMCIA) card. This invention is particularly well-suited for use in military or other such operations which require light-weight portable computers.

BACKGROUND OF THE INVENTION

People have been interested in analyzing and simulating the human voice since ancient times. Recently, interest in speech processing has grown with modern communication systems. Improved methods of speech processing can provide us with more sophisticated means for recording, securing, transporting, and imparting information. To illustrate, modern communications systems could include talking computers, information systems secured with a voiceprint password, and word processors or other typing machines that receive data through voice input (as opposed to manual or keyed input). Operators of telephones, computers, word processors, etc., could call others, enter data, request information, or control systems when their hands and eyes are busy or unavailable, and such systems could be used by sight-impaired persons. Voiceprints can be used to control access to protected services, such as phone cards, voice mail, customer accounts, and cellular service. See, for example, U.S. Pat. No. 5,414,755, issued to Lawrence G. Bahler on May 9, 1995, et al., entitled SYSTEM AND METHOD FOR PASSIVE VOICE VERIFICATION IN A TELEPHONE NETWORK, and assigned to ITT Corporation, the assignee herein, which discloses the use of speaker verification in connection with long-distance telephone services.

Automated speech processing may take many forms. For example, speech can be input into a device to (1) confirm or verify the identity of the speaker (known as speaker verification); (2) identify an unknown talker (speaker recognition); (3) convert what the speaker says into a graphical representation (speech recognition); (4) translate the substance of what the speaker has said, or have the device respond to the speaker's utterances (speech understanding); or (5) determine whether specific subjects were discussed or words uttered (word spotting). The method of this invention is particularly useful with regard to the speech recognition methods; the system of this invention enables an individual to train his or her voice on a specified continuous-speech recognition (CSR) task and, once trained, perform automatic speech recognition with that individual's voice. However, it is contemplated that this invention could be applied to other methods of speech processing as well. Voice recognition systems and methods have been developed, described in the prior art, and are well known. To illustrate, voice recognition systems have been developed by FIT Corporation, the assignee herein, and are disclosed in the following patents, each of which is hereby incorporated by reference: U.S. Pat. No. 4,811,399 issued to Landell, et al., on Mar. 7, 1989, entitled APPARATUS AND METHOD FOR AUTOMATIC SPEECH RECOGNITION; U.S. Pat. No. 4,933,973, issued to Porter on Jun. 12, 1990, entitled APPARATUS AND METHODS FOR THE SELECTIVE ADDITION OF NOISE TO TEMPLATES EMPLOYED IN AUTOMATIC SPEECH RECOGNITION SYSTEMS; U.S. Pat. No. 4,994,983 issued to Landell, et als., on Feb. 19, 1991, entitled AUTOMATIC SPEECH RECOGNITION SYSTEM USING SEED TEMPLATES; and U.S. Pat. No. 5,073,939, issued to Vensko, et als., on Dec. 17, 1991, entitled DYNAMIC TIME WARPING APPARATUS FOR USE IN SPEECH RECOGNITION SYSTEMS. Additionally, for further background regarding speech verification systems, see. for example, U.S. Pat. No. 5,339,385, issued to Higgins on Aug. 16, 1994, entitled SPEAKER VERIFIER USING NEAREST-NEIGHBOR DISTANCE MEASURE; U.S. Pat. No. 4,720,863 issued to Li on Jan. 19, 1988, entitled METHOD AND APPARATUS FOR TEXT-INDEPENDENT SPEAKER RECOGNITION; and U.S. Pat. No. 4,837,830, issued to Wrench, Jr. on Jun. 6, 1989, entitled MULTIPLE PARAMETER SPEAKER RECOGNITION SYSTEM AND METHODS. Each of these patents also have been assigned to ITT Corporation, the assignee herein, and are hereby incorporated by reference.

Generally, in speaker verification systems, "reference patterns" or Models of the speech phenomenon to be recognized are developed. The Models are then compared to subsequently obtained speech samples (i.e., unknown speech). The Models used for comparison are typically developed by measuring the waveforms of the spoken text and converting the analog waveform of the speaker's voice to digital form. In comparing the Models developed from the enrollment speech data (obtained from the known speaker), with Models developed from the test data (obtained from an unknown speaker), computer processing is applied to measure the Euclidean distance between the reference Models and the speech samples, which may be determined by applying a linear discriminant function (LDF), and/or by applying speech-recognition algorithms, which are well known and described in the literature and prior art patents cited herein. If the distance measured is less than a predetermined value, or in other words produces a certain "score" a decision is made to accept or reject the test data as having been uttered by the same person providing the enrollment data.

The present invention relates to systems used for computer processing of the speech data. For example, one such voice recognition system produced by ITT Corporation is the ITT VRS 1290 product. The processing elements for the VRS 1290 product are shown in FIG. 1. This system consists essentially of two components: a special-purpose board (in VME, PC, or multi-bus configurations), and software for training and recognition. As shown schematically in FIG. 1, the processing components of the VRS board further consist of a special purpose Dynamic Time Warping (DTW) chip, digital signal processor (DSP), central processing unit (CPU), and Codec. Incoming speech is digitized by the Codec (A), and then converted to filter-bank parameters in the dedicated DSP (B). The CPU (C) controls the overall operation of the system. Time-aligned match scoring between incoming speech and stored word templates is performed in the DTW (D). On-board memory is provided for storage of word templates, syntax structures, and required scratch buffers. The VRS 1290 software includes the dedicated firmware on the VRS board, and it also includes the host programs for generating syntax files, controlling the training procedures, and interpreting recognizer results for tasks to be controlled by speech recognition.

All aspects of this VRS system, including the DTW apparatus, algorithms for use in training and recognition, and general background regarding the methods involved in voice recognition, are disclosed and described in the ITT patents which were cited above and incorporated herein by reference. This invention is functionally equivalent to CSR systems which use the ITT VRS 1290 product, described above.

One objective of this invention is to implement the functional capabilities of voice recognition systems, such as the special purpose VRS 1290 hardware, with a relatively inexpensive and commercially available device, resulting in a cost advantage. Another objective of this invention is to provide a more practical voice recognition system that may be implemented with small, lightweight computers, such as, for example, the portable computers that are likely to be fielded in military operations.

SUMMARY OF THE INVENTION

The invention comprise s a speaker-dependent CSR system in which the recognition function is performed on a PCMCIA card. Components of the PCMCIA card include a DSP, Codec, and memory. All of the processing performed by the CPU, DSP, and special DTW chip in prior art system are performed in the single DSP on the PCMCIA card. Recognition results computed on the card are uploaded to the host computer application (for command interpretation and processing), via the PCMCIA interface. The invention may be operated with system hardware design and a set of computer programs for both the PCMCIA card and the host computer, further described below.

BRIEF DESCRIPTION OF THE DRAWINGS

For the purpose of illustrating the invention, there is shown in the figures block diagrams of the components of the system of the present invention, it being understood, however, that this invention is not limited by the precise diagrams shown.

DETAILED DESCRIPTION OF THE INVENTION

Figure 1:
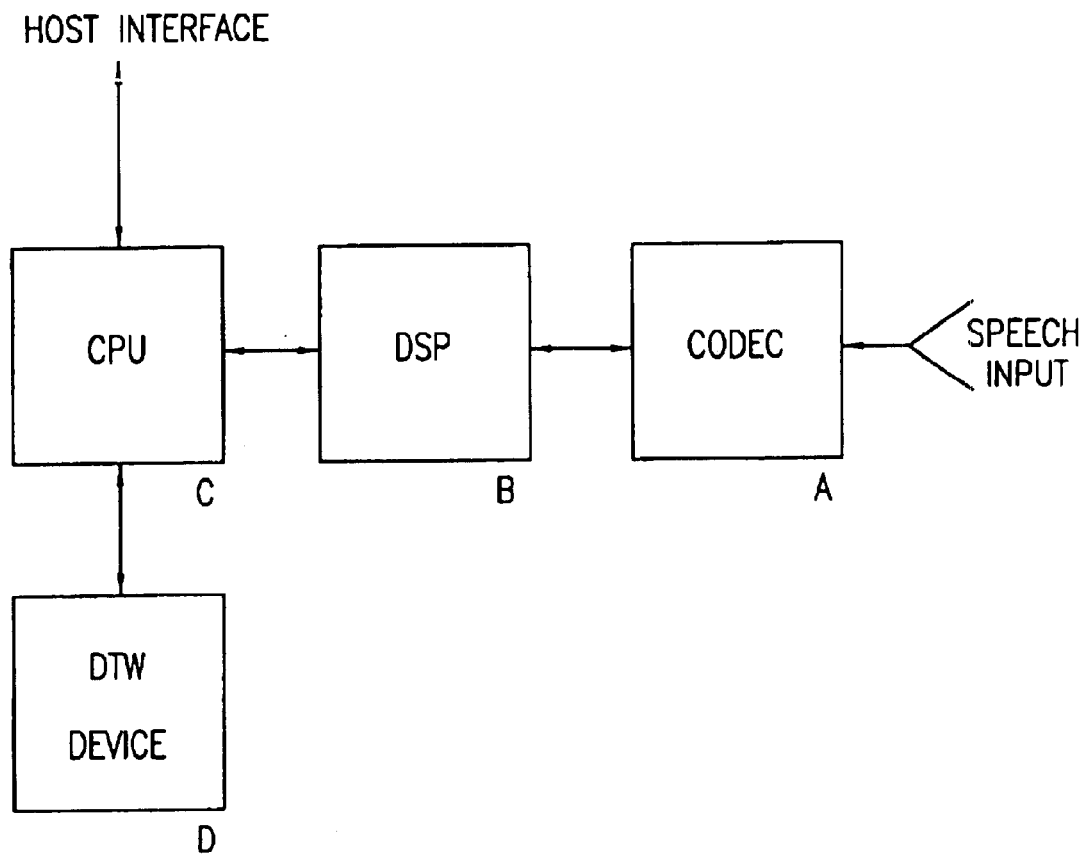
FIG. 1 is a block diagram showing the components of a prior art voice recognition system, namely, the ITT VRS 1290.
Figure 2:
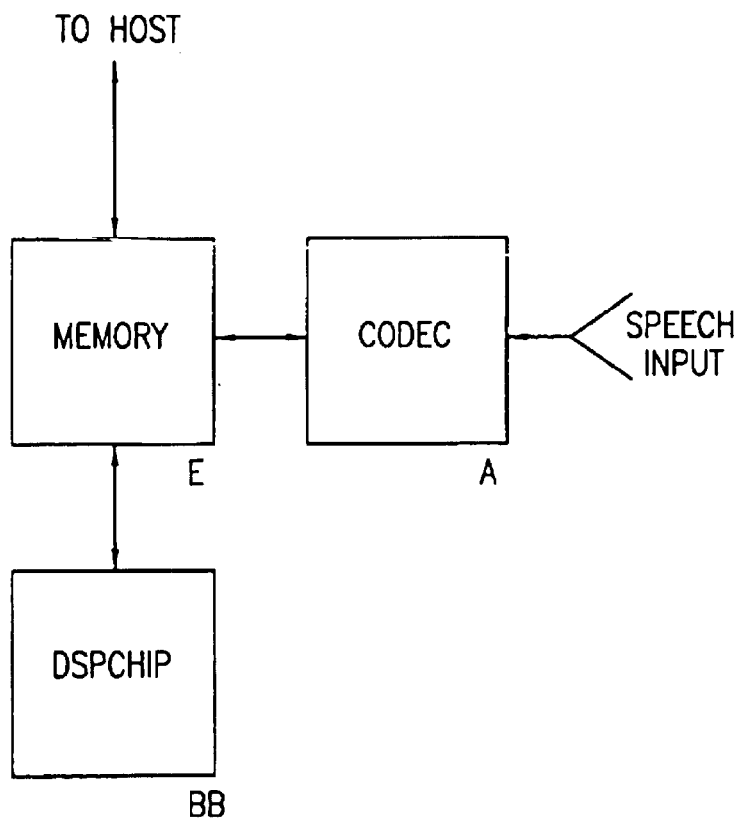
FIG. 2 is a block diagram showing the components of the voice recognition system of the present invention.

Referring to FIG. 2, there is shown the components of the PCMCIA card of the present invention. The PCMCIA card is a card which is formulated by the computer industry to accommodate speech processing and having predefined inputs and outputs which are totally uniform. Such a card can be inserted in a typical slot or associated with a typical connector employed by a personal computer or PC. These components include the Codec (A), a digital signal processor chip (DSPCHIP) (BB), and memory (E). All of the processing performed by the CPU, DSP, and special DTW chip on prior art boards, such as the VRS 1290 board (i.e., FIG. 1 at A, B, and D), are performed in the single DSPCHIP on the PCMCIA card. Host programs for controlling the PCMCIA recognizer (for training and recognition tasks), are functionally equivalent to those developed for prior art voice recognition systems, such as the VRS 1290.

Figure 3:
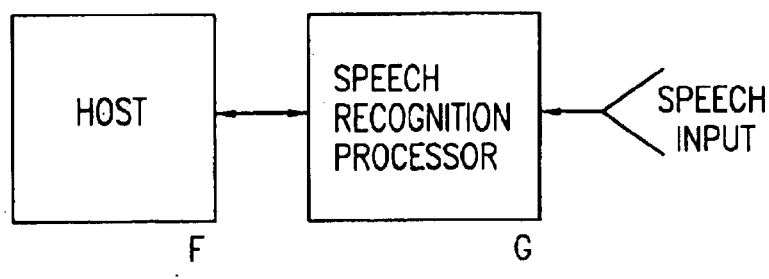
FIG. 3 is a block diagram providing a model for the continuous-speech recognition system of the present invention method.

The invention can be described in terms of the CSR system model shown in FIG. 3. Referring to FIG. 3, one can see that the system model consists of a host computer (F) to and a speech recognition processor (G). The processor (G) is peripheral to the host computer (F). The host computer runs an application which uses voice control for some aspects of its task. The peripheral "speech recognizer" component is responsible for the computationally intensive signal processing required to perform the speech recognition algorithms. The speech signal is input directly to the peripheral processor (G). Speech recognition results are accessible by the host (F) for application-specific command interpretation and processing. As a further illustration, in the voice recognition systems described in the above-cited patents, the VRS 1290 board (A, B, C, and D of FIG. 1), is the peripheral (speech recognizer) component. In this invention, the peripheral processor resides on the PCMCIA card.

Thus, the components utilized in operating this invention comprise (1) the host system hardware; (2) the host system software; (3) the PCMCIA card hardware; and (4) the PCMCIA software specifications. Each of these components are described below, followed by a description of a working prototype of the PCMCIA recognizer.

Host System (A) Hardware

The host computer is a PC compatible configured with a PCMCIA slot of the appropriate type for the card being used as the speech recognizer (for example, a type III slot for the prototype system described below). The host operating system is (SCO) Unix. As one will ascertain, Unix is a popular operating system which has predetermined modes of operation that are specified. Various companies supply the Unix operating system such as Santa Cruz Operations, which is the SCO Unix. For examples of the specifications and operation of the Unix system, reference is made to the text entitled *Encyclopedia of Computer Science*, 3rd Edition, by A. Ralston, Van Nostrand Reinholt, 1993, pages 1407–1409 entitled *Unix Operating System*. Drivers are provided for controlling the PCMCIA device and accessing its memory (read and write).

(B) Software

Software tools for syntax generation (syntool) and template training (tgs) are provided. These tools are completely compatible with the equivalent tools provided with prior art systems, such as the VRS1290 systems, and can work with the same seed template and syntax files.

A general purpose program (vrsrec) is used to control recognition tasks. This program includes a command interpreter for translating the recognizer output stream into commands for socket/server type control of tasks via voice command.

PCMCIA System.

Because of the intensity of the processing required for the speech recognition algorithms, PCMCIA components must meet certain minimum requirements. Important considerations for the hardware design are discussed for each component of the PCMCIA system (namely, Codec, the DSPCHIP, and memory, as shown in FIG. 2).

Codec.

The speech signal is input directly to the codec input pins on the PCMCIA card exterior receptacle. Both the sample rate and the codec gain must be software controllable from the recognizer program running on the DSP.

DSP Processor.

On the PCMCIA recognizer, the DSP is single-handedly responsible for performing the combined tasks of three different devices (CPU, DSP, and DTW chip) of prior art systems, such as the VRS 1290. In prior systems, the three processors (CPU, DTW, and DSP) operate in parallel, while the PCMCIA DSP of this invention must perform the equivalent respective tasks in serial. These tasks include processing messages from the host, performing frontend processing (pcm to parameters), performing the required recognition tasks (Euclidean distances followed by DTW time alignment), and possible template adjustment (during training or calibration).

In prior art systems, a dedicated hardware processor (the DTW apparatus) is used for the intensive inner-loop processing involved with time-aligned template matching. With this invention, the DSPCHIP is forced to run this largely Boolean algorithm entirely in software. This problem is compounded by the fact that DSP chips are designed to efficiently perform pipelined algorithms (such as infinite impulse response [IIR] filters and fast fourier transforms [FFTs]), but are not as efficient at Boolean-type operations. See a text entitled *VLSI Signal Processing II*, edited by S. Y. Kung et al, published by IEEE Press (1986), Part II entitled Algorithms and Architectures. Because of this, it is necessary to code the DTW algorithm in assembly in order to maximize throughput.

The DSP processor should be rated at least at 33 MFLOP (mega-FLOating Point operations per second), which in DSP parlance refers to a device which is capable of approximately (33,000,000/2) multiply-accumulate operations per second.

Memory.

It is important that the PCMCIA device have adequate zero-wait-state memory to hold the executable code and store word templates, syntax structures, filterbank coefficients, and scratch buffers (for intermediate results such as DTW distances). Additional memory, not necessarily zero-wait state, is required for buffering the input digital speech as well as the filter-bank parameter data. For relatively small tasks (100 words or less) 256 K of zero-wait-state memory is required. An additional Meg of memory, not necessarily zero-wait-state, is sufficient for the data buffers.

Host/PCMCIA Interface and the PCMCIA Software.

Recognizer source code (assembly and C language) files reside in files on the host system, as well as the compiler, assembler and liner software required for creating the executable DSP module. Programs for downloading the DSP executable to the PCMCIA device are located in libraries which are linked into the host application programs (such as tgs and vrsrec). Also in this library are programs for reading from and writing to PCMCIA memory and programs for controlling (start, halt) the DSP processor. Specific recognizer tasks are submitted to the recognizer via message passing.

As with the VRS 1290, the PCMCIA system has dedicated sections of memory for message passing between the host and recognizer processes. The message structure contains a header which identifies the message being passed (such as "load a template"), and a data buffer for those messages (tasks) which include data transmission (such as downloading templates, or uploading recognition results).

Recognition code is written almost entirely in C language, with the most intensive inner loop code written in assembly to optimize performance. Routines written in assembly are the filterbank, Euclidean Distance, and the DTW. DSP performances on a given piece of source code is influenced in a profound way by the efficiency of the compiler/optimizer in reducing the source code to assembly. Therefore, the efficiency of a device's compiler/optimizer is an important consideration in selecting a DSP.

A Prototype PCMCIA Speech Recognition System.

A prototype of this invention was implemented on a commercial type-III PCMCIA card, the DART DSP, manufactured by Communication, Automation and Control Incorporated (CAC). Included with the DART card is a software library of functions which allow the host to control the DSP and to access (read and write) PCMCIA memory. The CAC card used in this prototype system utilizes an ATT DSP3210 DSP rated at 33 MFLOP. This floating-point DSP is capable of real-time processing for applications having a relatively small number of active vocabulary words (80 or less). However, for larger tasks (on which the VRS 1290 could run in realtime), this DSP is incapable of real-time operation. A particular problem with the DSP3210 DSP is that it is a floating point device which is, in this application, forced to perform several functions in a fixed-point (such as the DTW algorithm).

A newer version of the DART DSP is now available with 1 M of SRAM. This would allow larger applications to be run on the device without modifying the existing code (albeit not in real time). Changing portions of the algorithm to floating-point from fixed-point would also increase the number of words which could be processed in real time. Utilization of a DSP which is efficient at both fixed and floating point operations would also improve throughput. A new product which has this feature is the CAC Bullet card which utilizes a DSP from the Texas Instruments TMS320C30 product line.

The PCMCIA system of this invention has at least three advantages over prior art systems. First, PCMCIA cards with appropriate hardware and software are commercially available and relatively inexpensive, resulting in a cost advantage. Second, the executable code which runs on the PCMCIA card is downloaded from the host at run time. This means that recognizer source code can be easily modified, if so desired, and the executable code remade without the need to burn-in new firmware. Third and finally, the PCMCIA card represents a more practical form factor for small, lightweight computers which are likely to be fielded in military applications and may require voice recognition.

However, a disadvantage of the PCMCIA system is that, as implemented on current commercially-available PCMCIA cards, the invention system is not capable of matching the real-time throughput (number of word templates processed) of prior art systems, such as the VRS 1290. On the other hand, as the processing capability of commercial DSP chips increases, the throughput discrepancy between the PCMCIA configuration and the VRS 1290 will narrow. Also, there are many practical applications which can be organized so that the average number of active word templates is small enough (less than 80) that the PCMCIA recognizer runs in real-time, or close to real-time.

The invention may be embodied in other forms or by applying other specific steps without departing from the spirit or essential attributes therefor. Thus, reference should be made to appended claims, rather than to the foregoing specification, as indicating the scope of the invention.

What is claimed is:

1. In a continuous-speech recognition system for the recognition of words spoken by an individual, including the steps of receiving input speech data, digitizing the speech data, and analyzing the speech data by a speech recognition module which compares the input speech data to previously obtained templates and generates respective match scores therefrom, the improvement wherein:

the continuous-speech recognition system is implemented on a system consisting of a personal computer host with a peripheral PCMCIA card; and, PCMCIA executable modules are stored on a host disk associated with said personal computer host and are downloaded to said PCMCIA card at run time so that the modules may be easily modified at any time, and wherein PCMCIA memory is accessible (read and write) by the personal computer host.

2. The continuous-speech recognition system of claim 1, wherein the PCMCIA card runs speech recognition software and provides results to the personal computer host in the form of a string of words, and wherein the personal computer host converts the word strings to commands for controlling applications through socket or server connections.

3. The continuous-speech recognition system of claim 1, wherein the personal computer host includes system hardware with specifications for interfacing with the PCMCIA and meeting requirements for the PCMCIA card, including a digital signal processor, memory, and codec.

4. The continuous-speech recognition system of claim 3, wherein the gain and sample rate functions of the PCMCIA codec are software controllable.

5. The continuous-speech recognition system of claim 3, further comprising programs and files for creating syntax files and training word models for an individual for specific continuous-speech recognition tasks.

6. The continuous-speech recognition system of claim 3, further comprising programs for performing recognition tasks with a trained speaker's word models, including software hooks for translating word strings into commands for socket-type control of application programs.

7. The continuous-speech recognition system of claim 1, wherein the PCMCIA card has a microphone interface disposed on its exterior receptacle which allows live speech to be digitized directly into PCMCIA memory.

8. The continuous-speech recognition system of claim 1, wherein said personal computer host is portable and lightweight.

9. In a continuous-speech recognition system, including the steps of receiving input training speech data during training procedures, digitizing the training speech data, converting the training speech data to filter bank parameters, storing the parameters of the training speech data as word templates, receiving input test speech data, digitizing the test speech data, converting the test speech data to filter bank parameters, and analyzing the test speech data by a speech recognition module which applies speech recognition algorithms to compare the test speech data to the templates and generate respective match scores therefrom, the improvement wherein:

the continuous-speech recognition system is implemented on a system consisting of a host computer and a speech recognition processor;

the host computer comprises a personal computer;

the speech recognition processor comprises a PCMCIA card that receives the input speech data, digitizes the speech data, and performs the match-scoring between the test speech data and the stored word templates;

the PCMCIA card is peripheral to the host computer; and, an executable operative to direct the functioning of said PCMCIA card is downloaded from said host computer to said PCMCIA card at runtime.

10. The continuous speech recognition system of claim 9, wherein said PCMCIA card can be reprogrammed without the need to burn-in new firmware.

11. The continuous-speech recognition system of claim 10, wherein the host computer includes hardware having drivers for controlling the PCMCIA card and accessing its memory.

12. The continuous-speech recognition system of claim 11, wherein the host computer includes software for performing syntax generation, template training, and a command interpreter for translating the recognizer output stream into commands for socket-type control of tasks by voice command.

13. The continuous-speech recognition system of claim 10, further comprising a microphone on the exterior of the PCMCIA card for receiving the input speech data.

14. The continuous-speech recognition system of claim 10, wherein the PCMCIA card runs speech recognition software and provides results to the personal computer host in the form of a string of words, and wherein the personal computer host converts the word strings to commands for controlling applications through socket or server connections.

15. The continuous-speech recognition system of claim 14, wherein the personal computer host includes system hardware with specifications for interfacing with the PCMCIA and meeting requirements for the PCMCIA card, including a digital signal processor, memory, and codec.

* * * * *